US011581606B2

(12) United States Patent
Bosscher

(10) Patent No.: US 11,581,606 B2
(45) Date of Patent: Feb. 14, 2023

(54) BICYCLE BATTERY STORAGE SYSTEM

(71) Applicant: Trek Bicycle Corporation, Waterloo, WI (US)

(72) Inventor: Nathan Paul Bosscher, Madison, WI (US)

(73) Assignee: Trek Bicycle Corporation, Waterloo, WI (US)

(*) Notice: Subject to any disclaimer, the term of this patent is extended or adjusted under 35 U.S.C. 154(b) by 361 days.

(21) Appl. No.: 16/800,005

(22) Filed: Feb. 25, 2020

(65) Prior Publication Data
US 2021/0265607 A1 Aug. 26, 2021

(51) Int. Cl.
*H01M 50/20* (2021.01)
*B60L 50/64* (2019.01)
*B60L 50/60* (2019.01)
*B62M 6/90* (2010.01)

(52) U.S. Cl.
CPC .............. *H01M 50/20* (2021.01); *B60L 50/64* (2019.02); *B60L 50/66* (2019.02); *B62M 6/90* (2013.01); *B60L 2200/12* (2013.01); *H01M 2220/20* (2013.01)

(58) Field of Classification Search
CPC ... H01M 50/20; H01M 2220/20; B60L 50/64; B60L 50/66; B60L 2200/12
See application file for complete search history.

(56) References Cited

U.S. PATENT DOCUMENTS

| 9,745,019 | B2 | 8/2017 | Evensen | |
| 2017/0096190 | A1* | 4/2017 | Yu | B62M 6/40 |
| 2019/0291810 | A1* | 9/2019 | Slaoui | B62M 6/40 |
| 2019/0337588 | A1* | 11/2019 | Wecker | B62J 43/13 |

FOREIGN PATENT DOCUMENTS

| CN | 203064153 U | 7/2013 | |
| CN | 203391951 U | 1/2014 | |
| CN | 106347567 A * | 1/2017 | ............ B62K 19/40 |
| CN | 208021665 U | 10/2018 | |
| DE | 202014009732 | 12/2014 | |
| DE | 102019100171 | 7/2019 | |
| EP | 3118096 | 9/2019 | |
| KR | 101207885 B1 | 12/2012 | |
| TW | M 583826 U | 9/2019 | |
| WO | WO2019167787 | 9/2019 | |

OTHER PUBLICATIONS

Extended Search Report for EP 21154018.2, dated Jun. 30, 2021.

* cited by examiner

Primary Examiner — Jonathan G Jelsma
(74) Attorney, Agent, or Firm — Bell & Manning, LLC

(57) ABSTRACT

A bicycle battery system includes a battery tray that mounts within a cavity formed by an opening in a bicycle tube. The battery tray includes a latch mechanism, a first base portion that mounts to the latch mechanism, and a second base portion that mounts to the first base portion. The first base portion includes a cup that is sized to mate with an interior of the bicycle tube. The system also includes a battery that is sized to fit within the battery tray. A first end of the battery includes a protrusion that is sized to fit within the cup of the first base portion, and a second end of the battery includes a secondary latch to secure the second end to the battery tray. The system further includes a battery cover plate mounted to the battery.

18 Claims, 11 Drawing Sheets

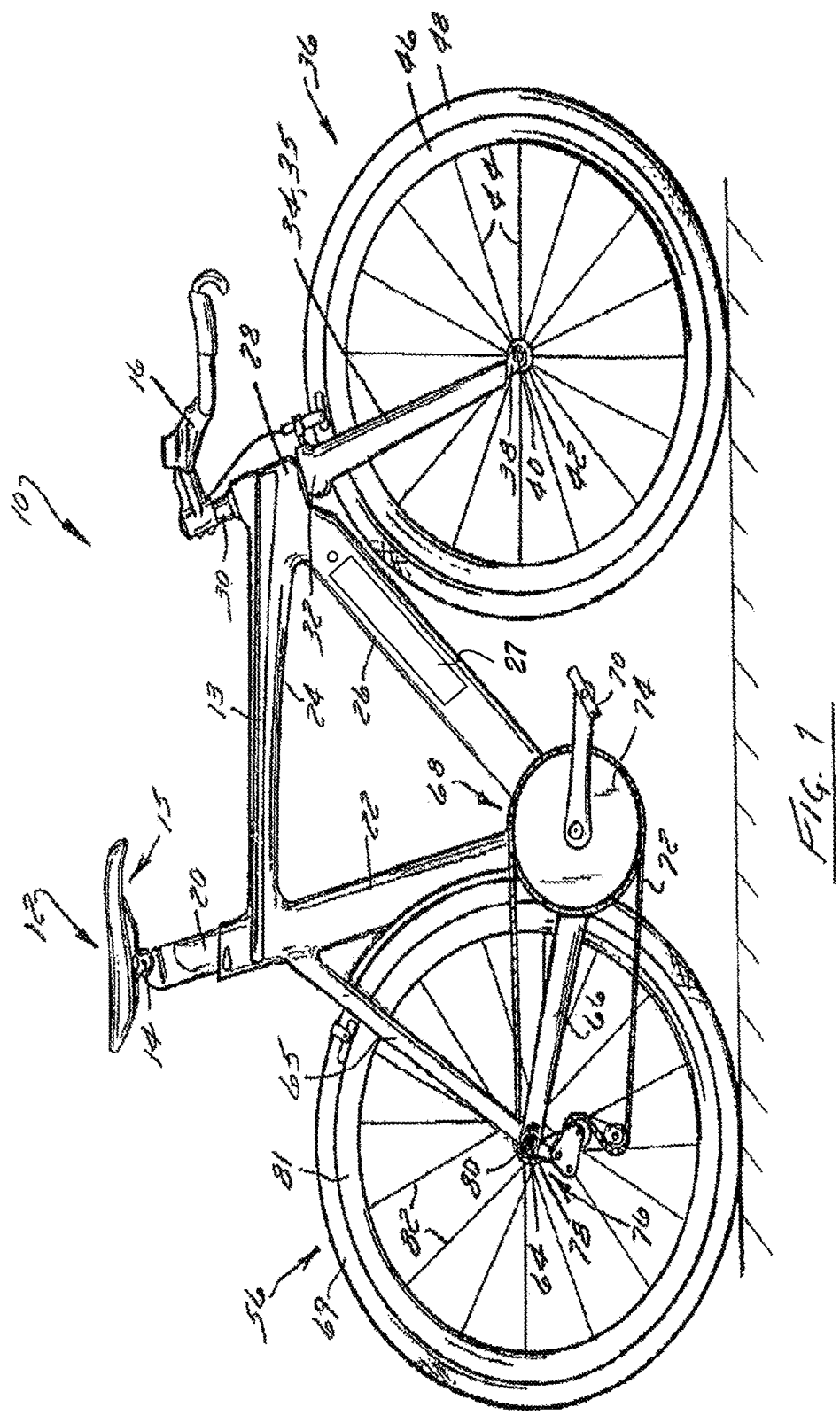

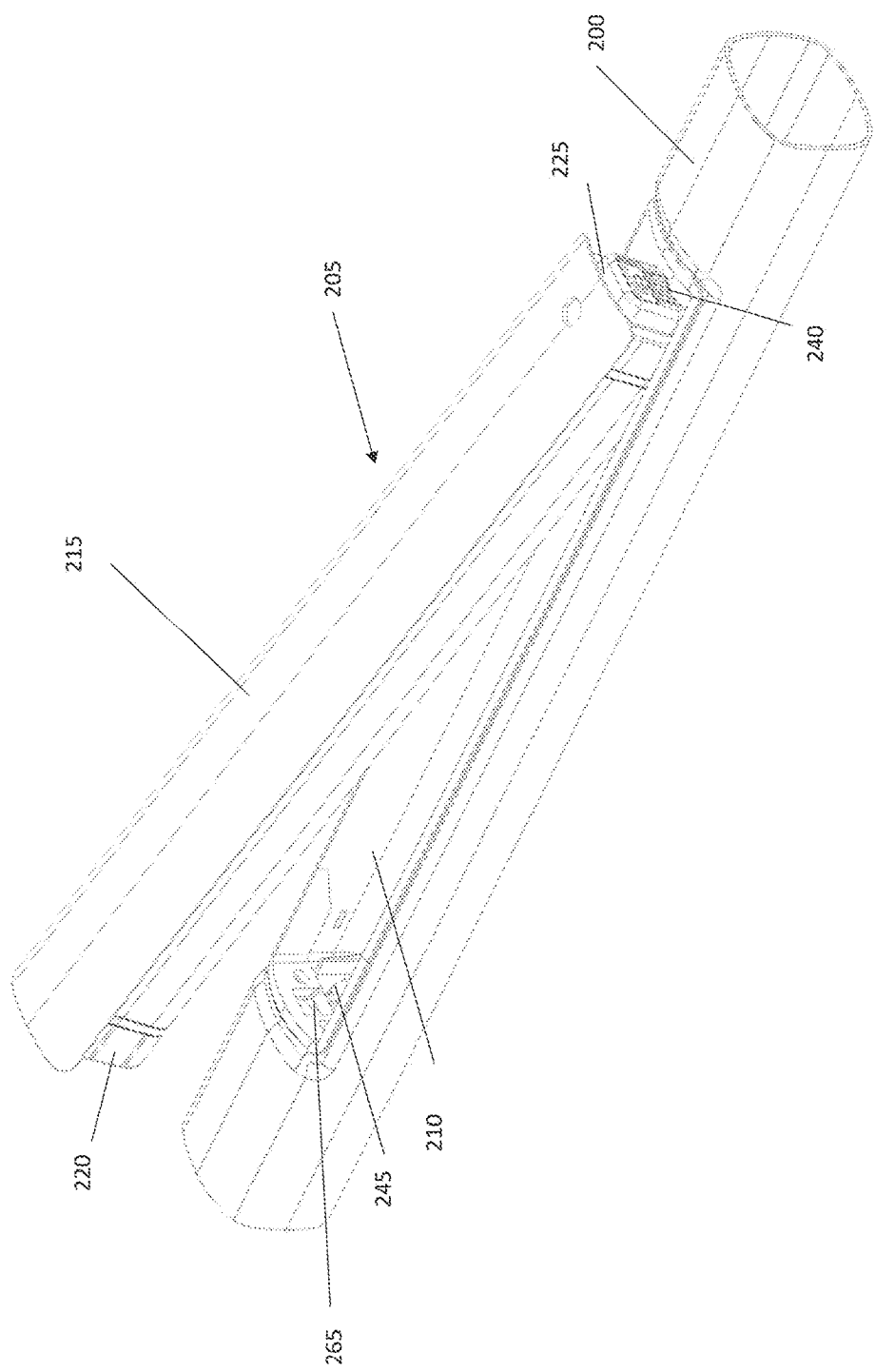

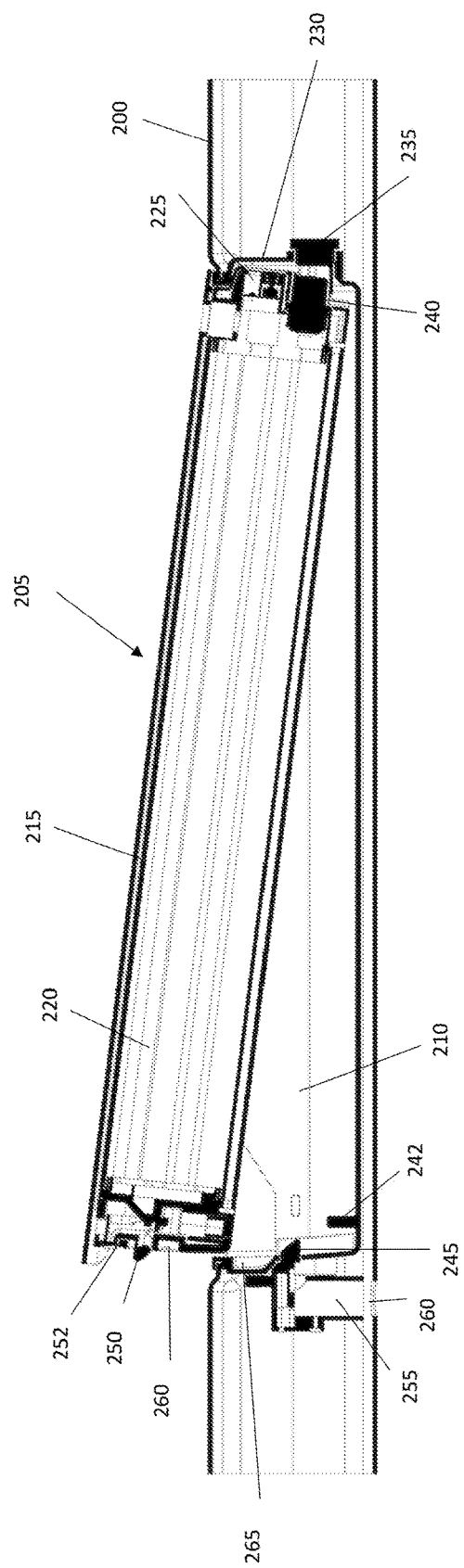

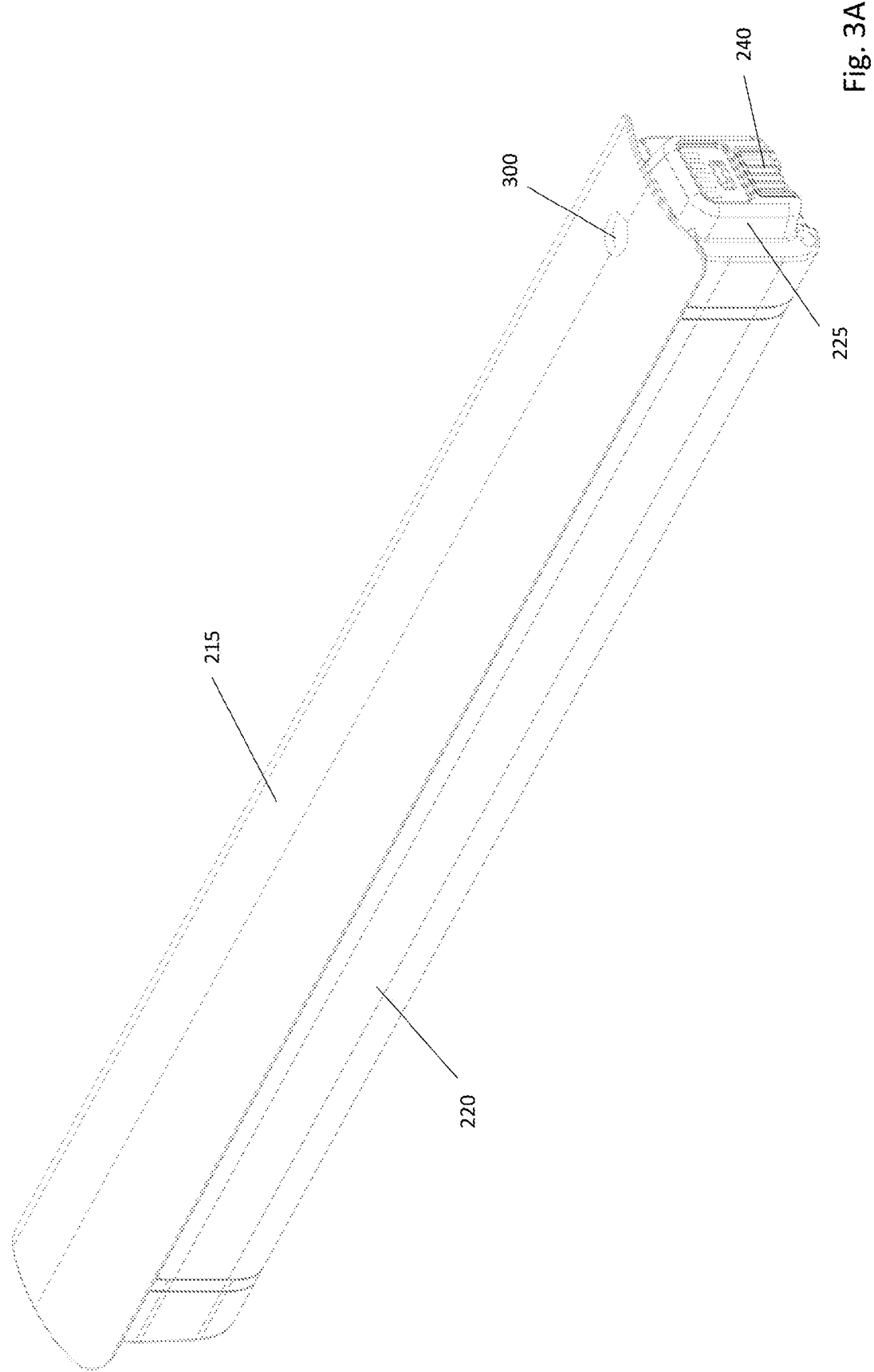

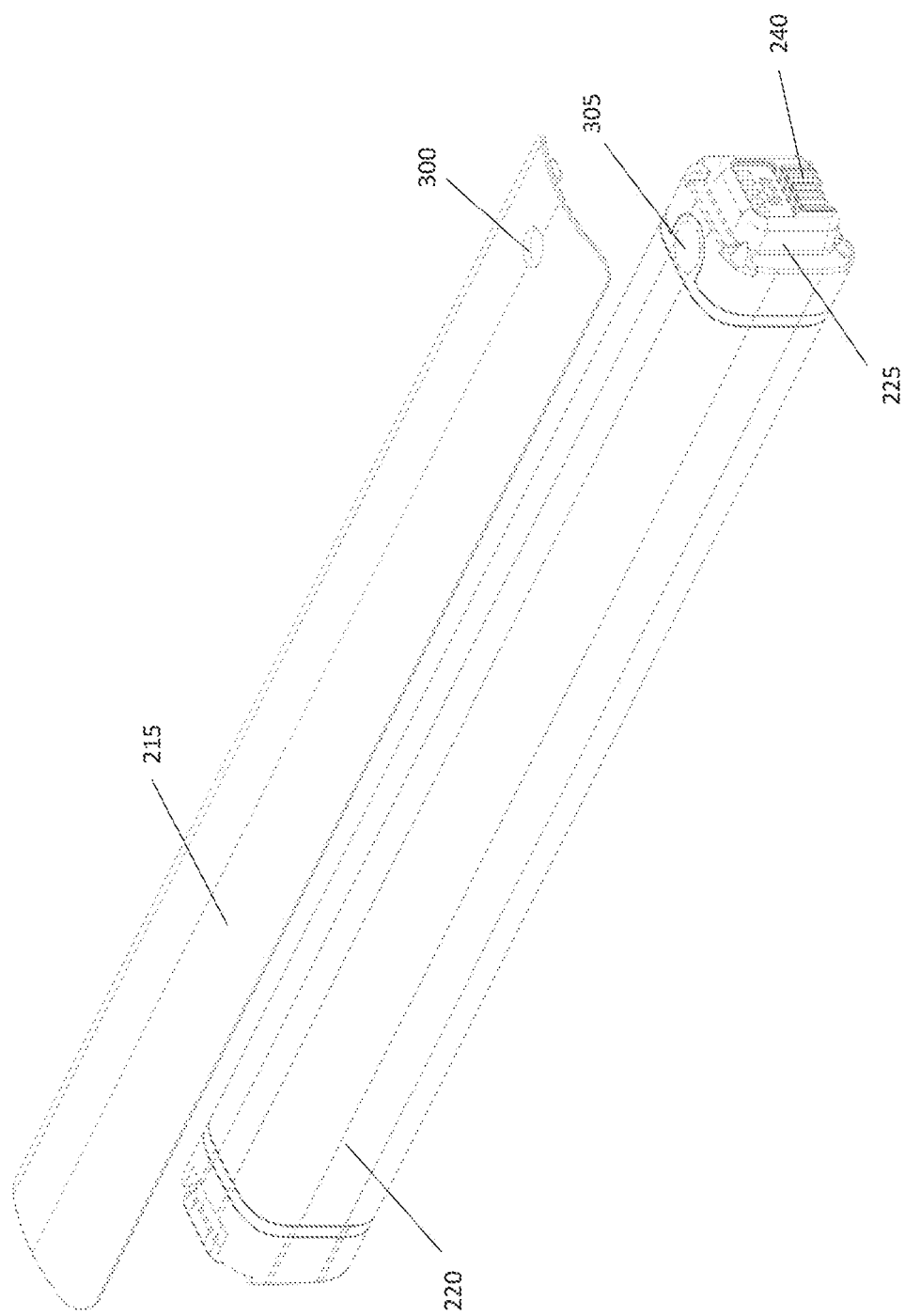

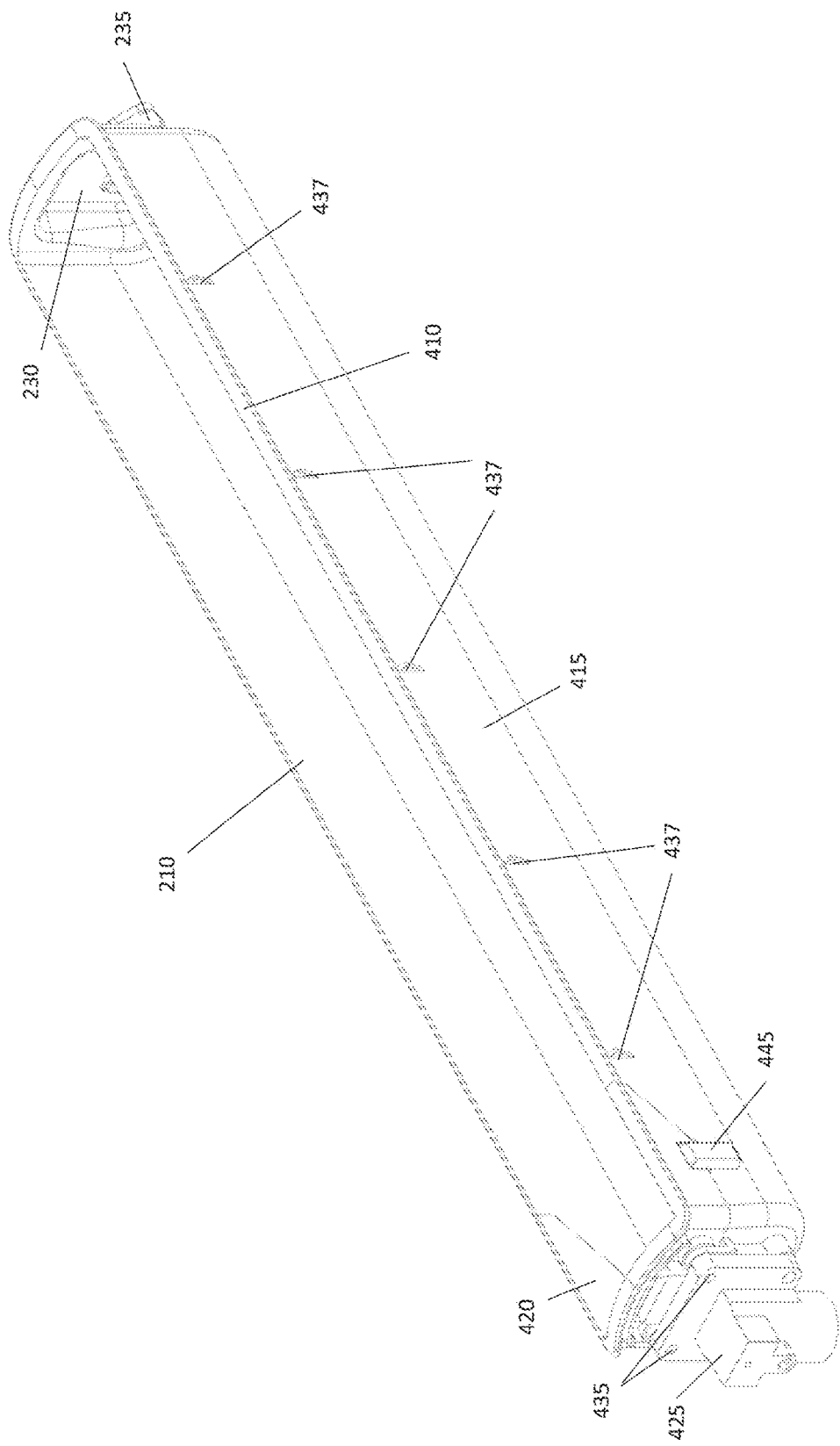

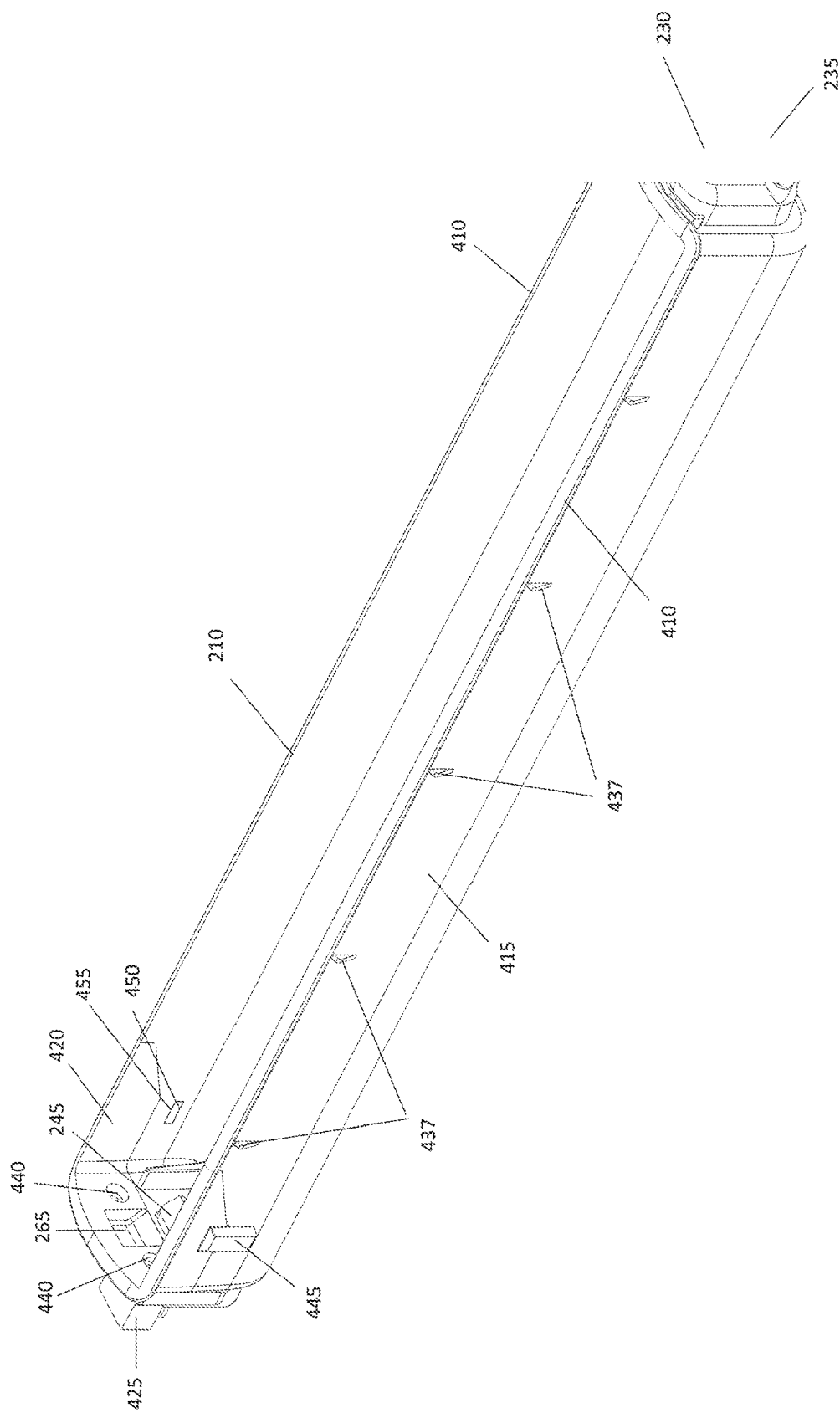

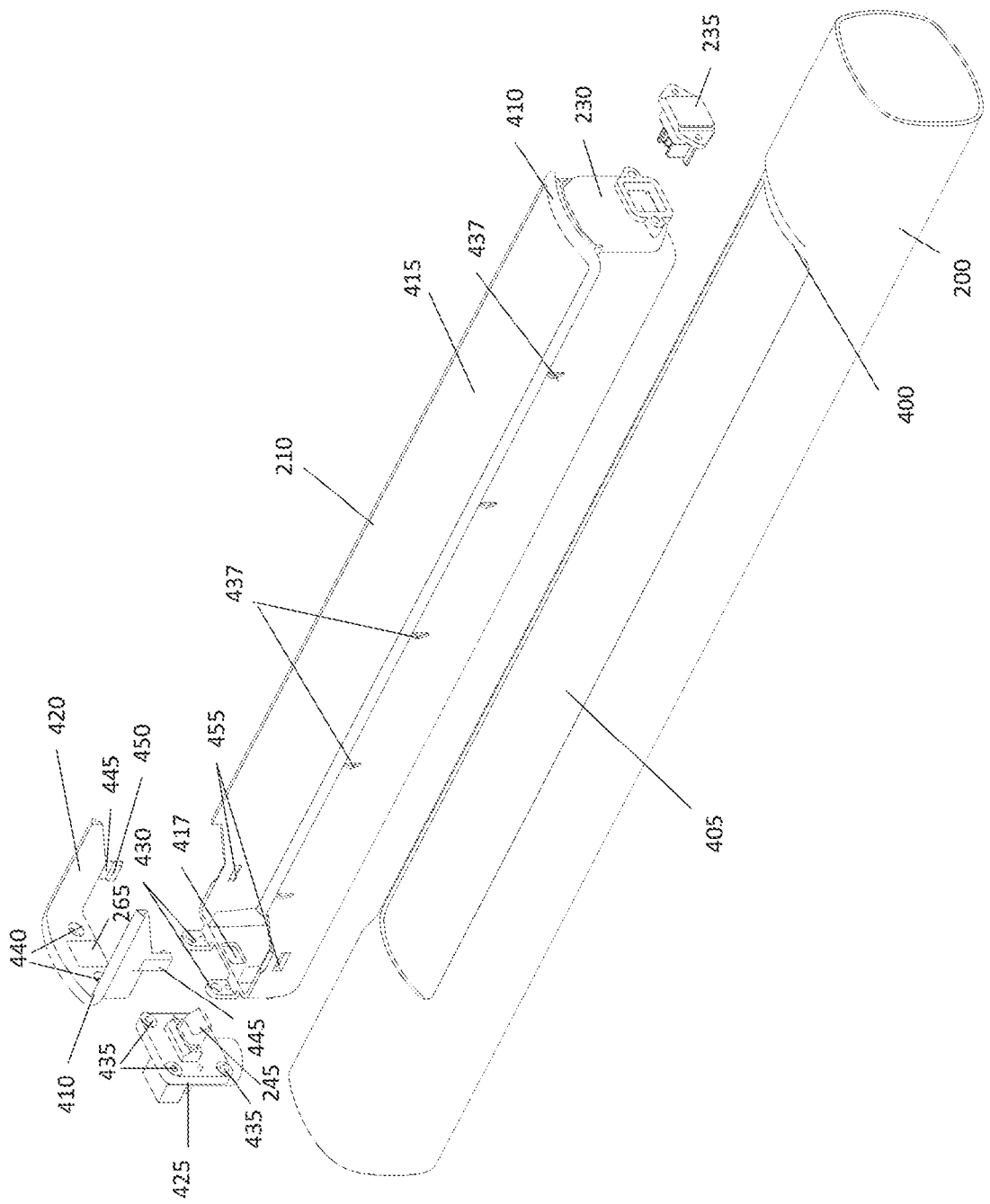

BICYCLE BATTERY STORAGE SYSTEM

BACKGROUND

An electric bicycle (or e-bike) can refer to a bicycle that incorporates a power source that assists a rider with bicycle propulsion. Some e-bikes provide a pedal assist functionality that engages only when the rider is pedaling, making it easier for the rider to travel on the bicycle. Other e-bikes provide an on-demand power functionality in which the power source can propel the bicycle regardless of whether the rider is pedaling. Other e-bikes combine both the pedal-assist and the on-demand power functionalities to provide the rider with more options. The power source used in an e-bike can include one or more of a rechargeable battery, a supercapacitor, a motor, a belt drive system, etc.

SUMMARY

An illustrative bicycle battery system includes a battery tray that mounts within a cavity formed by an opening in a bicycle tube. The battery tray includes a latch mechanism, a first base portion that mounts to the latch mechanism, and a second base portion that mounts to the first base portion. The first base portion includes a cup that is sized to mate with an interior of the bicycle tube. The system also includes a battery that is sized to fit within the battery tray. A first end of the battery includes a protrusion that is sized to fit within the cup of the first base portion, and a second end of the battery includes a secondary latch to secure the second end to the battery tray. The system further includes a battery cover plate mounted to the battery.

A bicycle battery tray includes a latch mechanism configured to mount within an interior of a bicycle tube. The battery tray also includes a first base portion that is sized to fit within an opening formed in the bicycle tube. The first base portion mounts to the latch mechanism, and a back end of the first base portion includes a cup that is sized to mate with the interior of the bicycle tube. The battery tray also includes a second base portion that is sized to fit within the opening formed in the bicycle tube, where the second base portion mounts to the first base portion.

Other principal features and advantages of the invention will become apparent to those skilled in the art upon review of the following drawings, the detailed description, and the appended claims.

BRIEF DESCRIPTION OF THE DRAWINGS

Illustrative embodiments will hereafter be described with reference to the accompanying drawings, wherein like numerals denote like elements. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

FIG. 1 shows a bicycle equipped with an internal bicycle battery assembly that is constructed in accordance with the illustrative embodiments described herein.

FIG. 2A depicts a first perspective view of a portion of a down tube that includes a battery assembly in accordance with an illustrative embodiment.

FIG. 2C is a cross-sectional view of the battery assembly partially inserted into the down tube in accordance with an illustrative embodiment.

FIG. 3A is a perspective view of the battery and battery cover plate in accordance with an illustrative embodiment.

FIG. 3B is an exploded view of the battery and battery cover plate in accordance with an illustrative embodiment.

FIG. 4A is a first perspective view of the battery tray in accordance with an illustrative embodiment.

FIG. 4B is a second perspective view of the battery tray in accordance with an illustrative embodiment.

FIG. 4C is an exploded view of the battery tray in accordance with an illustrative embodiment.

DETAILED DESCRIPTION

Figure 2B:
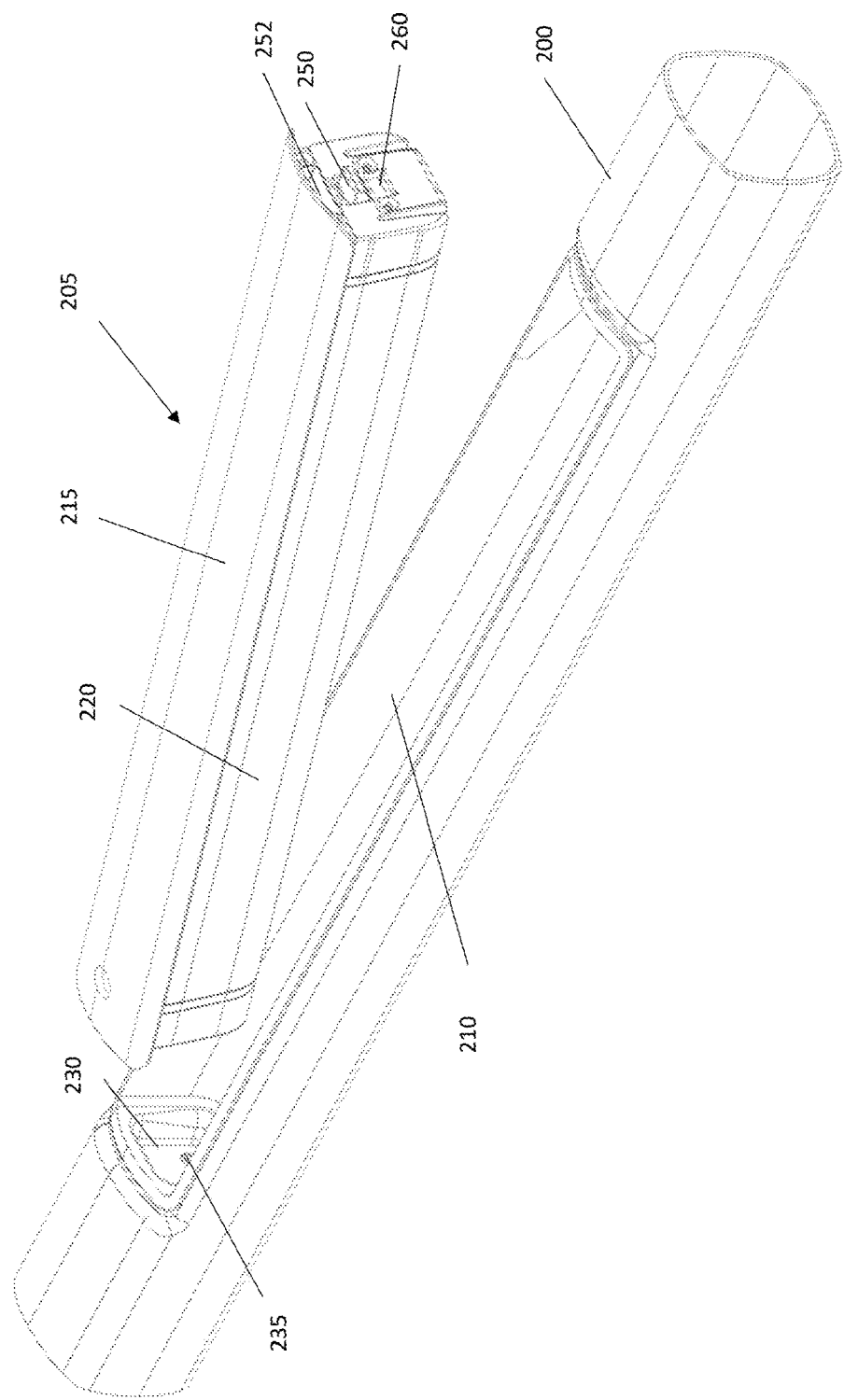
FIG. 2B depicts a second perspective view of the portion of the down tube that includes the battery assembly in accordance with an illustrative embodiment.

Many traditional e-bikes include a battery or other power source that is mounted on a rack or bracket that is attached to an external surface of the bicycle frame. For example, some traditional e-bikes utilize a rack that is mounted behind the bicycle seat and above the rear tire, and that is configured to secure the power source for the e-bike. However, such a mounting configuration can result in a higher center of gravity for the e-bike, which results in a less stable ride. Additionally, such placement of the power source takes up valuable space and limits the rider's ability to store gear, tools, etc. on the bicycle.

Described herein is an internal bicycle battery assembly that is incorporated into the frame of the bicycle. The internal bicycle battery assembly allows the battery to be removed by the user and saves space on the bicycle frame for the mounting of racks, water bottles, gear, etc. As discussed in more detail below, the proposed internal bicycle battery assembly also includes a two-stage locking feature to help prevent the battery from falling off of the e-bike and to help prevent the battery from being dropped when it is removed by a user.

FIG. 1 shows a bicycle 10 equipped with an internal bicycle battery assembly 27 that is constructed in accordance with the embodiments described herein. The internal bicycle battery assembly 27 can be used to provide power to a motor (not shown) or other component(s) to assist with propulsion of the bicycle 10. The bicycle 10 also includes a frame 13 to which a seat assembly 12 and handlebars 16 are attached. A seat clamp 14 is engaged with an underside 15 of seat assembly 12 and cooperates with a seat post 20 that slidably engages a seat tube 22 of frame 13. A top tube 24 and a down tube 26 extend forwardly from seat tube 22 to a head tube 28 of frame 13. As depicted in FIG. 1, the internal bicycle battery assembly 27 is incorporated into the down tube 26. In alternative embodiments, the internal bicycle battery assembly could be incorporated into the top tube 24 or the seat tube 22. Additionally, the internal bicycle battery assembly 27 is shown on a side of the down tube 26 in FIG. 1 for illustrative purposes. It is to be understood that the internal bicycle battery assembly 27 can alternatively be mounted to a top surface or a bottom surface of the down tube 26.

Handlebars 16 are connected to a steerer tube 30 that passes through head tube 28 and engages a fork crown 32. A pair of forks 34, 35 extend from generally opposite ends of fork crown 32 and are constructed to support a front wheel assembly 36 at an end thereof or fork tip 38. Fork tips 38 engage generally opposite sides of an axle 40 that is constructed to engage a hub 42 of front wheel assembly 36. A number of spokes 44 extend from hub 42 to a rim 46 of front wheel assembly 36. A tire 48 is engaged with rim 46 such that rotation of tire 48, relative to forks 34, rotates rim 46 and hub 42.

A rear wheel assembly 56 is positioned generally concentrically about a rear axle 64. A seat stay 65 and a chain stay 66 offset rear axle 64 from a crankset 68. Crankset 68 includes pedals 70 that are operationally connected to a flexible drive such as a chain 72 via a chain ring or sprocket 74. Rotation of chain 72 communicates a drive force to a rear section 76 of bicycle 10 having a gear cluster 78 positioned thereat. Gear cluster 78 is generally concentrically orientated with respect to rear axle 64 and includes a number of variable diameter gears.

Gear cluster 78 is operationally connected to a hub 80 associated with a rear tire 69 of rear wheel assembly 56. A number of spokes 82 extend radially between hub 80 and a rim 81 that supports tire 69 of rear wheel assembly 56. As is commonly understood, rider operation of pedals 70 drives chain 72 thereby driving rear tire 69 which in turn propels bicycle 10. Additionally, the internal bicycle battery assembly 27 supports a battery which provides pedal-assist and/or on-demand power functionalities. It is appreciated that bicycle 10 could be provided in either of a road bicycle, mountain bicycle, off-road bicycle, trail bicycle, etc. configuration. It is appreciated that each configuration includes features generally directed to the intended operating environment of the bicycle. For example, trail bicycles generally include more robust suspension and tire systems than road bicycles.

FIG. 2A depicts a first perspective view of a portion of a down tube 200 that includes a battery assembly 205 in accordance with an illustrative embodiment. FIG. 2B depicts a second perspective view of the portion of the down tube 200 that includes the battery assembly 205 in accordance with an illustrative embodiment. FIG. 2C is a cross-sectional view of the battery assembly 205 partially inserted into the down tube 200 in accordance with an illustrative embodiment. As depicted, the battery assembly 205 is mounted on a top surface of the down tube 200. Alternatively, the battery assembly 205 may be mounted on a side or bottom of the down tube 200. In another alternative embodiment, the battery assembly 205 may be mounted to a different portion of the bicycle frame. The battery assembly 205 includes a battery tray 210 mounted within the down tube, a battery cover plate 215, and a battery 220.

The battery tray 210 is sized to receive the battery 220, and is a rigid structure with a constant length that allows the battery 220 to fit perfectly within the frame every time it is mounted. To the contrary, many traditional systems rely on separate front/rear components that mount within the frame to receive the ends of the battery. However, in such traditional systems, the front/rear components mounted within the frame are subject to movement, which can result in the battery not properly fitting the opening in the frame. Additionally, as described herein, the battery tray 210 is designed to accurately locate and align the battery 220 in the frame opening, which precludes the need for special adjustability considerations and/or features to provide adjustability in multiple axes. In some embodiments, the battery tray 210 can also be installed in the frame without the need to place any fastener holes in the frame. In alternative implementations, fastener holes in the frame (and associated fasteners) to secure the battery tray) may be used. In another illustrative embodiment, the battery tray 210 is made from plastic. Alternatively, a different material may be used such as carbon, aluminum, etc.

In another illustrative embodiment, the battery cover plate 215 forms an external surface of the battery assembly 205, and is mounted to the battery 220 via one or more fasteners, one or more straps, etc. The battery cover plate 215 can be made from the same material as the down tube 205 and can have the same appearance (i.e., color, shape, gloss, graphics, etc.) as the down tube 205. Example materials can include carbon fiber, aluminum, plastic, and stainless steel. In alternative embodiments, the battery cover plate 215 may be made from a different material and/or have a different appearance relative to the down tube 200. The battery cover plate 215 is used to help secure and protect the battery 220 within the cavity of the down tube 200 or other portion of the bicycle frame in which the battery assembly 220 is positioned.

As shown, a back end of the battery 220 includes a protrusion 225 that is sized to fit within a cup 230 at a back end of the battery tray 210. The cup 230 is sized to receive the protrusion 225 and is designed to help hold the battery 220 in place. The shape of the cup 230 also helps guide the battery 220 into the proper position as the user is mounting it. Mounted to an opening in the cup 230 is a first battery connector 235. Wires can extend from the first battery connector 235 to power various electrical components of the bicycle such as lights, a drive system, display screens, sensors, other accessories, etc. When the battery 220 is mounted within the battery tray 210, the first battery connector 235 mates with a second battery connector 240 that is mounted to the protrusion 225 on the back end of the battery 220. The electrical connection between the first battery connector 235 and the second battery connector 240 allows the battery 220 to provide power to the various electrical components of the bicycle.

To mount the battery 220 into the bicycle frame, the protrusion is placed into the cup 230 with the battery 220 at an angle relative to the battery tray 210 (e.g., FIG. 2C). As discussed above, placement of the protrusion 225 into the cup 230 causes the first battery connector 235 to mate with the second battery connector 240. The front end of the battery 220 is then pushed down into the battery tray 210, which is mounted within the bicycle frame. A two-stage locking mechanism is used to secure the battery 220 to the battery tray 210 and prevent unwanted ejection of the battery 220. As described in more detail below, a plunger 242 works in conjunction with the two-stage locking mechanism to help secure the battery 220 during mounting and to help release the battery 220 during removal.

A primary latch 245 of the two-stage locking mechanism is included on the front end of the battery tray 210, and a secondary latch 250 is included on the front end of the battery 220. The primary latch 245 is controlled by a lock 255 that is mounted to the battery tray 210 and that in at least some embodiments is accessible to the user through a keyhole 260 in the down tube 200. In one embodiment, the keyhole 260 can also be configured to receive a charging cord such that the battery 220 can be charged while the battery assembly 205 is mounted to the down tube 200. Alternatively, in some embodiments, a separate charging port may be included on the down tube 200 and/or the battery assembly 205. The secondary latch 250 is controlled by a release 252 that the user can activate to release the battery 220 from the battery tray 210. The release 252 can be a button, handle, lever, etc. that the user activates to disengage the secondary latch 250, as described in more detail below.

When the front end of the battery 220 is pressed into the battery tray 210, the bottom front corner of the battery 220 contacts the primary latch 245, which is spring-loaded, and causes the primary latch 245 to depress into the lock 255 until the primary latch 245 comes into contact with a latch cavity 260 that is on the front of the battery 220. Once the primary latch 245 comes into contact with the latch cavity 260, the spring-loaded primary latch 245 moves from the depressed position back into the extended position. The extended position of the primary latch 245 is shown in FIG. 2C. The interaction between the primary latch 245 in the extended position and the latch cavity 260 prevents the front end of the battery from releasing until the lock 255 is activated.

The secondary latch 250 is designed to prevent the battery 220 from falling off of the bicycle when the lock 255 is activated to release the battery 220. During mounting of the battery 220, the secondary latch 250, which is spring-loaded, contacts a front edge of the battery tray 210 which causes the secondary latch 250 to move from an extended position to a depressed position. As the battery 220 is depressed further into the battery tray 210, the second latch 250 aligns with a latch cavity 265 that is on the front of the battery tray 210. Once the secondary latch 250 comes into contact with the latch cavity 265, the spring-loaded secondary latch 250 moves from the depressed position back into the extended position. The extended position of the secondary latch 250 is shown in FIG. 2C. The interaction between the secondary latch 250 in the extended position and the latch cavity 265 prevents the front end of the battery from fully releasing when the lock 255 is released (i.e., activated). The back end of the battery 220 is secured by the connection between the protrusion 225 and the cup 230, as discussed above.

While the battery 220 is mounted within the battery tray 210, the plunger 242 keeps a constant outward pressure on the bottom of the battery 220. This outward pressure is in the direction that the battery ejects. The outward pressure helps prevent movement of the battery 220 during use of the bicycle. In some embodiments, the plunger 242 is spring-loaded and depresses into the battery tray 210 and/or down tube 200 when the battery is inserted. Alternatively, the plunger 242 may be a rigid member that depresses a spring-loaded tab of the battery 220. In such an embodiment, spring-loaded tab recedes into the battery 220 as a result of pressure from the plunger 242 (i.e., the plunger 242 at least partially goes into the battery 220), and the spring-loaded tab generates the outward pressure on the battery when it is mounted.

To remove the battery 220 from the bicycle, the user activates the lock 255. Activation of the lock 255 places the primary latch 245 into the depressed position such that the pressure from the plunger 242 (or spring-loaded tab) causes the front end of the battery 220 to partially eject from the bicycle frame. The lock 255 can be activated by a key through the keyhole 260 in the bicycle frame in an illustrative embodiment. Alternatively, the lock 255 may be activated via a wireless signal or other remote control mechanism.

Upon activation of the lock 255, the battery 220 only partially ejects because the plunger 242 (or spring-loaded tab) causes secondary latch 250 to contact an upper surface of the latch cavity 265, thereby preventing further ejection of the battery 220. The latch cavity 265 is therefore sized to allow the secondary latch 250 to travel a distance (e.g., approximately one half inch) therein. When the secondary latch 250 contacts the upper surface of the latch cavity 265 (i.e., the battery 220 is partially ejected), the release 252 on the end of the battery 220 becomes accessible to the user. The user can press the release 252 on the battery 220 to cause the secondary latch 250 to move from the extended position to the depressed position such that the secondary latch 250 no longer contacts the upper surface of the latch cavity 265 and the front end of the battery 220 can be removed. Upon release of the front end of the battery 220, the back end of the battery 220 detaches from the back end of the battery tray 210 as the user increases the distance between the front end of the battery 220 and the battery tray 210. Specifically, the protrusion 225 on the battery 220 releases from the cup 230 on the battery tray 210 as the user removes front end of the battery away from the battery tray 210. The second battery connector 240 on the battery 220 similarly detaches from the first battery connector 235 mounted to the battery tray 210.

FIG. 3A is a perspective view of the battery 220 and battery cover plate 215 in accordance with an illustrative embodiment. FIG. 3B is an exploded view of the battery 220 and battery cover plate 215 in accordance with an illustrative embodiment. The battery 220 can be a lithium-ion battery or any other type of battery known in the art. In an illustrative embodiment, the battery 220 is used to provide power to one or more components that enable pedal assist and/or on-demand power for the bicycle. The one or more components that receive power from the battery 220 can include one or more hub motors or any other type of electric motor(s) known in the art, lights, displays, other accessories, etc. The battery 220 can be connected to the one or more hub motors, etc. using wiring as known in the art.

In one embodiment, the battery cover plate 215 can be secured to the battery 220 via screws or other fasteners. Alternatively, straps, an adhesive, an integral connection such as solder/weld, clips, a male/female connector, etc. may be used to secure the battery cover plate 215 to the battery 220. The battery cover plate 215 includes an opening 300 that aligns with a charging port 305 on the battery 220. As such, a user is able to charge the battery 220 through the charging port 305 while the battery 220 is mounted to the bicycle. Alternatively, the opening and charging port may not be included. In an alternative embodiment, the opening 300 in the battery cover plate 215 can be designed to receive a fastener that secures the battery cover plate 215 to the battery 220.

As shown in FIG. 3A, edges of the battery cover plate 215 extend past the front, back, and side edges of the battery 220. As a result, the edges of the battery cover plate 215 are able to rest on a lip of the battery tray 210 when the battery 220 and battery cover plate 215 is installed. The lip, which is shown in FIG. 4, rests in the opening in the bicycle frame upon an indented portion of the frame that forms the opening. Specifically, the lip is designed to rest upon this indented portion of the frame that forms the battery opening such that the battery cover plate 215 is flush with the remaining surface of the bicycle tube when installed.

Figure 4D:
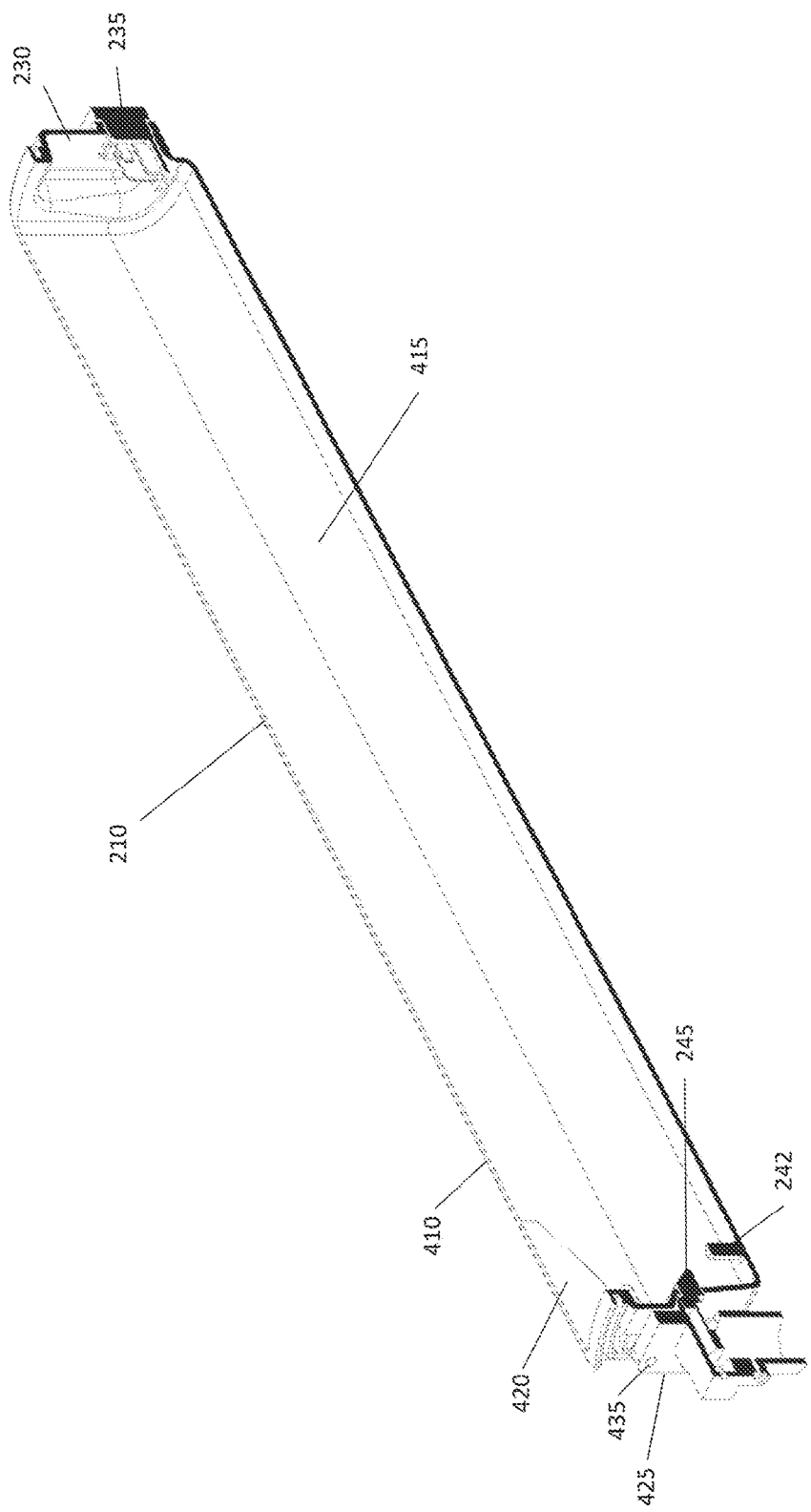
FIG. 4D is a lengthwise sectional view of the battery tray in accordance with an illustrative embodiment.

FIG. 4A is a first perspective view of the battery tray 210 in accordance with an illustrative embodiment. FIG. 4B is a second perspective view of the battery tray 210 in accordance with an illustrative embodiment. FIG. 4C is an exploded view of the battery tray 210 in accordance with an illustrative embodiment. FIG. 4D is a lengthwise sectional view of the battery tray in accordance with an illustrative embodiment. As discussed above, the battery tray 210 is designed and sized to fit within a tube of a bicycle frame (e.g., down tube, top tube, etc.), such as the down tube 200 depicted in FIG. 4C. As shown, the down tube 200 includes an indentation 400 that surrounds an opening 405 that is designed to receive the battery tray 210. The battery tray 210 includes a lip 410 that fits the indentation 400 such that the battery cover plate 215 mounts flush with the portions of the down tube 200 that are adjacent to the opening 405.

As shown in the exploded view of FIG. 4C, the battery tray 210 is made up of several components. These components include a first base portion 415, a second base portion 420, a latch mechanism 425, and the first battery connector 235. The second base portion 420 is designed to mount to the first base portion 415 and to the latch mechanism 425 once the first base portion 415 and the latch mechanism are installed in the frame. Specifically, to install the battery tray 210 into the frame, the latch mechanism 425 is inserted into the opening 405 and positioned in the down tube 200 such that the latch mechanism 425 is within the down tube 200 (e.g., at the front end of the opening 405) and does not obstruct the opening where the remainder of the battery tray 210 is to be positioned. The first base portion 415 can then be inserted into the opening 405 with the back end first such that the cup 230 and attached first battery connector 235 clear the lip 410 that surrounds the opening 405. The front end of the first base portion 415 can then be secured to the already installed latch mechanism 425 to secure the first base portion 415 to the bicycle frame. The first base portion 415 is secured to the frame at the back end due to the interaction of the cup 230 with the interior of the down tube 200. Specifically, the cup 230 is sized to securely fit within the interior of the down tube 200. The first base portion 415 is secured to the frame at the front end due to the attachment of the first base portion 415 to the latch mechanism 425, which is sized to fit within the down tube 200. The second base portion 420 is then mounted to the first base portion 415 and to the latch mechanism 425. The first base portion 415 also includes a slot 417 that is sized to receive the primary latch 245 of the latch mechanism 425 such that the primary latch 245 can be used to secure the battery 220 to the battery tray 210.

In an illustrative embodiment, the first battery connector 235 mounts to the first base portion 415 via two fasteners (e.g., screws). A back end of the first battery connector 235 can include wiring or a wiring connector that distributes power from the battery 220. In alternative embodiments, the first battery connector 235 may be integrally formed into the first base portion 415, or connected by a different method such as an adhesive or male/female connection. The first base portion 415 can mount to the latch mechanism 425 via fasteners in one embodiment. Specifically, fasteners can be inserted via the opening 405 in the frame into holes 430 in the first base portion 415 and further into holes 435 in the latch mechanism 425 that are aligned with the holes 430. Alternatively, a different method of attachment may be used. Additionally, as shown, an exterior surface of the battery tray 210 includes tabs 437 that are designed to contact an interior of the down tube 200 to provide a tight fit of the battery tray 210 within the opening 405 so that the battery assembly does not move or make noise during operation of the bicycle.

In an illustrative embodiment, fasteners are initially used in a pair of the holes 435 at the bottom of the latch mechanism 425 to secure the first base portion 415 to the latch mechanism 425. In such an embodiment, a pair of the holes 435 at the top of the latch mechanism 425 is used to secure the latch mechanism 425 to the first base portion 415 and to the second base portion 420. The second base portion 420 includes holes 440 that align with an upper pair of the holes 430 in the first base portion 415 and an upper pair of the holes 435 in the latch mechanism 425. Fasteners can therefore be used to secure all three components to one another. Additionally, the second base portion 420 includes tabs 445 that extend downward from the second base portion 420 and that include protrusions 450. The protrusions are sized to be received by slots 455 in the first base portion 415 such that the second base portion 420 is securely fastened to the first base portion 415. The tabs 445 are designed to extend over outer surfaces of the first base portion 415 such that the protrusions 450 are received in the slots 455 from the outer surface of the first base portion 415.

Figure 5:
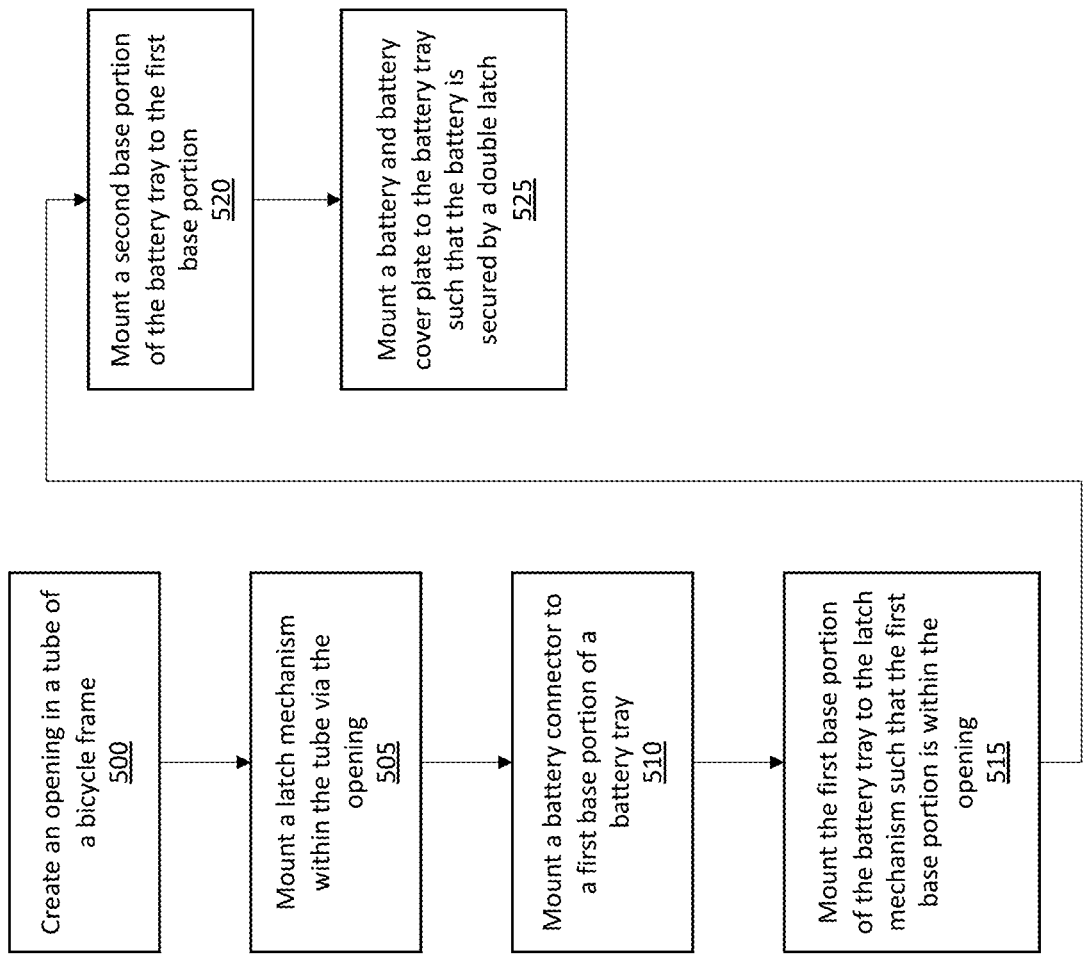
FIG. 5 is a flow diagram that includes operations performed to install a battery assembly into a bicycle frame in accordance with an illustrative embodiment.

FIG. 5 is a flow diagram that includes operations performed to install a battery assembly into a bicycle frame in accordance with an illustrative embodiment. In alternative embodiments, fewer, additional, and/or different operations may be performed. Also, the use of a flow diagram is not meant to be limiting with respect to the order of operations performed. In an operation 500, an opening is created in a tube of a bicycle frame. The opening can be in a down tube, top tube, seat tube, head tube, or any other portion of the bicycle frame. The opening can also be on a top, bottom, or (either) side of the tube of the bicycle frame. In an illustrative embodiment, the opening can be made by a computer numerical control (CNC) cutting system. Alternatively, any other method may be used. For example, in one embodiment the opening can be formed as part of a molding process that forms the bicycle frame. In an illustrative embodiment, the opening is formed such that there is an indentation in the frame surrounding the opening. This indentation receives a lip of the battery tray and allows the battery cover plate to rest flush with the rest of the tube once the battery is installed.

In an operation 505, a latch mechanism is mounted within the tube via the opening. The latch mechanism, which can be the latch mechanism 425 shown in FIG. 4, can include a lock, a primary latch, a keyhole, and one or more openings for receiving fasteners such that other components can be mounted thereto. In an illustrative embodiment, the latch mechanism 425 is sized to securely fit via friction within the bicycle tube (i.e., adjacent to an end of the opening in the tube). Alternatively, the latch mechanism 425 may be mounted within the tube via one or more fasteners, solder, weld, adhesive, etc.

In an operation 510, a battery connector is mounted to a first base portion of a battery tray that is designed to cradle the battery. The battery connector can be a male or a female electrical connector that is configured to mate with a (female or male) electrical battery connector that is mounted to the battery. The mating between these two connectors allows power from the battery to be distributed throughout the bicycle via wiring that runs within the bicycle frame.

In an operation 515, the first base portion of the battery tray is mounted to the latch mechanism such that the first base portion is within the opening in the bicycle frame. In an illustrative embodiment, a back end of the first base portion includes a cup that is sized to securely fit within the bicycle tube adjacent to the opening. As such, the back end of the first base portion can be inserted into the opening (so that the cup mates with the tube) prior to pressing the front end of the first base portion into the opening. In one embodiment, fasteners are used to secure the first base portion to the latch mechanism. As described herein, tabs can be positioned on exterior surfaces (i.e., sides) of the first base portion so that the first base portion fits snugly within the opening. Additionally, a lip along the upper edge of the first base portion is designed to rest upon a portion of the indentation that surrounds the opening in the tube.

In an operation 520, a second base portion of the battery tray is mounted to the first base portion. In an illustrative embodiment, the second base portion is also mounted to the latch mechanism. Fasteners can be used to mount the second base portion to the first base portion and/or to the latch mechanism. Additionally, as discussed above, the second base portion can include tabs with protrusions thereon that mate with slots in the first base portion. The second base portion can also include a lip along its upper edge that is designed to rest upon a portion of the indentation that surrounds the opening in the tube.

In an operation 525, a battery and attached battery cover plate are mounted to the battery tray such that the battery is secured by a double latch. The battery cover plate can be mounted to the battery using fasteners, adhesive, etc. In an illustrative embodiment, a back end of the battery is inserted first such that a protrusion on the back of the battery is received by the cup of the battery tray. As the protrusion is placed into the cup, the battery connector on the battery mates with the battery connector in the battery tray to form an electrical connection. The front end of the battery is pressed down and the battery is secured to the battery tray by a pair of latches as described herein.

In one embodiment, a primary latch of the latch mechanism mates with a latch cavity formed in the front end of the battery. By activating a lock, the primary latch releases and a plunger mounted to the bottom of the battery tray (or alternatively a spring-loaded tab on the bottom of the battery that contacts the plunger) pushes the front end of the battery outward from the opening. At this time, the back end of the battery is still secured via the interaction between the protrusion on the battery and the cup in the battery tray. The front end of the battery can be pushed outward approximately 0.5 inches such that a release mounted to the battery is accessible to a user. Alternatively, a different distance may be used such as 0.3 inches, 0.75 inches, etc. The release is connected to a secondary latch that extends from the battery into a latch cavity of the battery tray. By activating the release, the secondary latch is withdrawn from the latch cavity and the front end of the battery can be swung free from the opening. Once the front end of the battery is free of the opening, the back end of the battery can be pulled out such that the battery is completely removed from the bicycle.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more".

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A bicycle battery system, comprising:
   a battery tray that mounts within a cavity formed by an opening in a bicycle tube, wherein the battery tray includes a latch mechanism, a first base portion that mounts to the latch mechanism, and a second base portion that mounts to the first base portion, and wherein the first base portion includes a cup that is sized to mate with an interior of the bicycle tube; and
   a battery that is sized to fit within the battery tray, wherein a first end of the battery includes a protrusion that is sized to fit within the cup of the first base portion, and wherein a second end of the battery includes a secondary latch to secure the second end to the battery tray;
   a plunger positioned at a bottom of the battery tray such that the plunger depresses into the battery tray responsive to insertion of the battery, wherein the plunger is configured to apply outward pressure onto the battery; and
   a battery cover plate mounted to the battery.

2. The bicycle battery system of claim 1, wherein the latch mechanism includes a primary latch that secures the second end of the battery to the battery tray and a lock that controls the primary latch.

3. The bicycle battery system of claim 2, wherein the second end of the battery includes a latch cavity that is sized to receive primary latch.

4. The bicycle battery system of claim 2, wherein the battery tray includes a slot through which the primary latch passes.

5. The bicycle battery system of claim 2, further comprising a keyhole for the lock, wherein the keyhole is in the bicycle tube.

6. The bicycle battery system of claim 1, wherein the battery tray includes a latch opening that is configured to receive the secondary latch.

7. The bicycle battery system of claim 6, further comprising a release on the battery, wherein activation of the release withdraws the secondary latch from the latch opening in the battery tray.

8. The bicycle battery system of claim 6, wherein the latch opening in the battery tray is sized to enable the secondary latch to move a distance within the latch opening.

9. The bicycle battery system of claim 1, wherein, upon release of a primary latch of the latch mechanism, the outward pressure from the plunger causes the secondary latch to traverse the distance in the latch opening.

10. The bicycle battery system of claim 1, wherein the second base portion includes a tab and the first base portion includes a slot, and wherein the slot is configured to receive at least a portion of the tab to secure the second base portion to the first base portion.

11. The bicycle battery system of claim 1, further comprising one or more first fasteners to secure the first base portion to the latch mechanism and one or more second fasteners to secure the second base portion to the first base portion.

12. The bicycle battery system of claim 11 wherein the one or more second fasteners also secure the second base portion to the latch mechanism.

13. The bicycle battery system of claim 1, further comprising a first battery connector mounted to the cup of the battery tray and a second battery connector mounted to the protrusion on the battery, wherein the first battery connector mates with the second battery connector upon placement of the protrusion in the cup.

14. The bicycle battery system of claim 1, further comprising an indentation of the bicycle tube that surrounds the opening in the bicycle tube, and wherein the battery tray includes a lip that is designed to rest in the indentation that surrounds the opening in the bicycle tube.

15. The bicycle battery system of claim 14, wherein the battery cover plate rests upon the lip such that an outer surface of the battery cover plate is flush with an outer surface of the bicycle tube.

16. The bicycle battery system of claim 1, further comprising a plurality of tabs on an exterior surface of the battery tray that are designed to contact an interior of the bicycle tube.

17. A bicycle battery tray, comprising:
   a latch mechanism configured to mount within an interior of a bicycle tube;
   a first base portion that is sized to fit within an opening formed in the bicycle tube, wherein the first base portion mounts to the latch mechanism, and wherein a back end of the first base portion includes a cup that is sized to mate with the interior of the bicycle tube;
   a second base portion that is sized to fit within the opening formed in the bicycle tube, wherein the second base portion mounts to the first base portion; and
   a plunger positioned at a bottom of the first base portion such that the plunger depresses into the first base portion of the bicycle battery tray, wherein the plunger is configured to apply outward pressure.

18. The bicycle battery tray of claim 17, wherein the first base portion and the second base portion include a lip that is designed to rest in an indentation that surrounds the opening in the bicycle tube.

* * * * *